United States Patent

[11] 3,549,010

[72] Inventors Paul G. Marsh
 Hamilton;
 Earl T. Blakley, Cincinnati, Ohio
[21] Appl. No. 741,712
[22] Filed July 1, 1968
[45] Patented Dec. 22, 1970
[73] Assignee The Black Clawson Company
 Hamilton, Ohio
 a corporation of Ohio

[54] METHODS AND APPARATUS FOR DISPOSING OF WASTE MATERIALS
15 Claims, 1 Drawing Fig.

[52] U.S. Cl. .................................................. 210/71, 210/73
[51] Int. Cl. .................................................. B01d 21/26
[50] Field of Search .......................................... 210/63, 66, 67, 71, 73, 152, 170, 178, 179, 181, 197, 205, 208, 260; 209/10, 11, 238

[56] References Cited
UNITED STATES PATENTS
| | | | |
|---|---|---|---|
| 2,046,845 | 7/1936 | Raisch .......................... | 210/152X |
| 2,246,224 | 6/1941 | Streander ..................... | 210/152 |
| 2,846,072 | 8/1958 | Goetz ............................. | 210/67 |
| 3,309,262 | 3/1967 | Copeland et al. ............. | 210/152(UX) |
| 3,339,851 | 9/1967 | Felton et al. .................. | 210/152(UX) |
| 3,357,793 | 12/1967 | Hanway et al. ............... | 210/152(UX) |

Primary Examiner—John Adee
Attorneys—Marechal, Biebel, French and Bugg

ABSTRACT: Waste sludges, particularly sludges resulting from the treatment of municipal sewage, but also including industrial waste sludges, are mixed with the residue obtained by the pulping of garbage, trash and other municipal refuse for the purpose of aiding the conjoint ultimate disposal of both types of wastes. The sludge is mixed with the pulped slurry of municipal wastes in order to take advantage of the ease with which the resulting mixed waste materials can be dewatered to a consistency appropriate for convenient ultimate disposal, especially by incineration in a fluidized bed reactor or other incinerating apparatus.

PATENTED DEC 22 1970
3,549,010
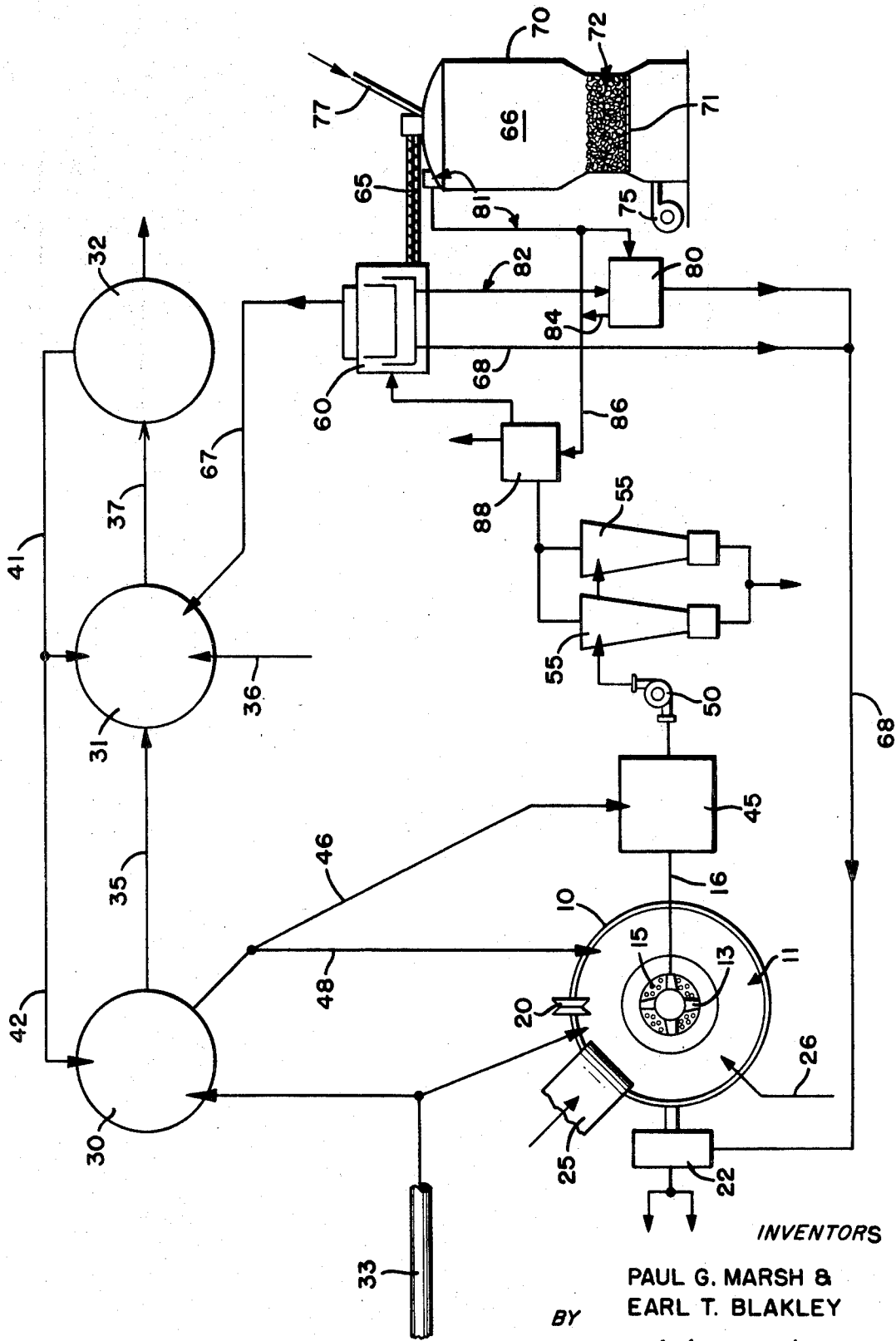
INVENTORS
PAUL G. MARSH &
EARL T. BLAKLEY
BY *Marechal, Biebel, French & Bugg*
ATTORNEYS

3,549,010

METHODS AND APPARATUS FOR DISPOSING OF WASTE MATERIALS

CROSS REFERENCE TO PENDING APPLICATION

Joseph Baxter, Jr., Ser. No. 719,197 filed Apr. 5, 1968.

BACKGROUND OF THE INVENTION

Waste sludges, of which the primary example is the sludge resulting from conventional treatments of municipal sewage, provide a continuing and growing disposal problem for all municipalities. Sewage consists primarily of wastes from residential, institutional and industrial toilets, baths and sinks, and in some communities it also includes the output of the storm sewer system. It consists very largely of water and dissolved solids, usually in excess of 99 percent, with the suspended solids content comprising both organic and inorganic constituents, approximately one-half of which are unstable organic materials subject to decay. Chemical and bacterial metabolism are constantly taking place in sewage, tending to reduce it by oxidation.

The process of decomposition of organic matter depends upon the affinity of the particular matter for oxygen and the amount of oxygen which is available. Fresh sewage in which aerobic bacteria act is relatively odorless because oxygen is still available. Once the available oxygen is exhausted, anaerobic bacteria take over, and cause putrification to set in. The sewage is then in a "stale" condition, and it begins to give off a putrid odor.

The present methods of sewage treatment and disposal which are most commonly used employ both the presence and absence of oxygen. The initial step involves settling of raw sewage sludge in a primary sedimentation tank, where the oxygen contained therein is nearly exhausted by aerobic digestion. In the further treatment of this settled sludge, it is transported to digestion tanks where closely controlled conditions enable anaerobic digestion to reduce it in the absence of oxygen and to break down the complex protein and carbohydrate structures into lower forms. This decomposition process commonly requires as much as 10 to 15 days, and the resulting stable sludge is then dried on open sand beds or dewatered in mechanical thickeners to a point at which it can be incinerated, or perhaps used for fill purposes or as low grade fertilizer.

Primary sedimentation sludge is difficult to dewater, because it is an unstable and relatively slimy gelatinous matrix. The process of digestion by which it is transformed into a more readily handled residue requires not only a substantial period of time but also careful maintenance of appropriate environmental conditions. The digestion equipment for this purpose is expensive, and its maintenance and supervision costs are also high. Furthermore, the digested sludge must be further treated for ultimate disposal, and the most economical final disposal procedure still appears to be incineration.

The foregoing comments with respect to sewage sludges apply also to other types of waste sludges, which result from the operation of a number of industries. For example, a number of metallurgical and chemical processes give rise to sludges having insufficient value to justify any further treatment except incineration or some other form of ultimate disposal. The operations of paper mills also give rise to waste sludges which are comparable to sewage sludge in the difficulty of handling and dewatering to a consistency compatible with incineration or other ultimate disposal.

SUMMARY OF THE INVENTION

The present invention deals with two major considerations which are involved in the treatment and disposal of waste sludges. One is the problem of dewatering raw sludge, particularly primary sedimentation sludge, to a consistency suitable for incineration, or other subsequent final disposal treatment. The invention is also concerned with the provision of a fast and efficient method of disposing of the dewatered sludge, particularly sludge subject to putrification, while at the same time minimizing the cost of equipment and procedures for this purpose. The invention provides a successful solution to these several problems through a treatment of waste sludges in combination with municipal refuse which affords outstanding economy and other advantages in the handling of both types of waste material.

The term refuse is a term of art which denotes, as indicated for example, in the American Paper Institute Report No. 114, Sept. 11, 1967, a conglomeration of such diverse materials as cardboard, newspaper, miscellaneous paper, plastic film, leather, molded plastics, rubber, garbage, grass and dirt, textiles, wood, glass, ceramics, stones and metallics, and when used herein it is used in this technically accepted sense. It is not used to denote garbage, which comprises only a fraction of such refuse.

The above Baxter application discloses a method and system for effectively converting solid and municipal refuse, such as garbage and trash, into a pumpable aqueous slurry capable of extraction through a perforate screen. It has been found in accordance with the present invention that the solid components of the resulting extracted slurry are particularly suited for conditioning undigested sludges for a dewatering treatment to a consistency facilitating their ultimate disposal. By way of example, tests of the composition of average samples of municipal refuse on an oven dried basis indicate that the slurry produced by treatment as described in the Baxter application will contain between 70 and 75 percent of the solid constituents of the refuse. Also, more than 50 percent of the solids suspended in the slurry comprise paper products, and an additional 5 percent or more will consist of wood and other readily combustible material.

Sewage sludges constitute a relatively small proportion of the total of solid wastes requiring disposal by the average municipality, namely of the order of 5 percent. As a result, while the undigested sludge is a gelatinous mass which is extremely difficult to dewater, when it is mixed with the pulped municipal refuse collected for a comparable time period, it constitutes such a relatively small portion of the total as to offer no appreciable resistance to dewatering of the total mass. Conversely, there is so high a proportion of fibrous constituents in the total mass, namely more than 50 percent, that the mass as a whole is relatively free draining and is not affected in this respect by the intermixed sludge.

There will of course be a significant amount of incombustible material in the extracted slurry produced in accordance with the Baxter application, particularly grit such not only as sand and gravel but also glass, ceramics and small pieces of metal. These materials, however, are relatively easily removed to a major extent by conventional cleaning equipment such particularly as centrifugal cleaners, and it is in fact desirable to effect such cleaning before dewatering, particularly if the dewatering is carried out on a vacuum filter or similar equipment subject to damage by gritty particles in the slurry.

After the mixture of sludge and municipal refuse has been dewatered, which may be accomplished by means of a vacuum filter, screw press, centrifuge or other suitable concentrating apparatus, the removed liquid may be handled in a variety of ways, a particularly useful procedure being to sterilize it and return it to the pulping station as the aqueous pulping medium therein. The solid "filter cake" produced by the dewatering process, comprising sludge and other solid wastes, is easily disposed of by incineration in a fluidized bed reactor or other incinerating apparatus. Since this mass includes a large proportion of fibrous materials of high combustibility, it substantially retains that property even though the added sludge may be somewhat less readily combustible, and its incineration will be essentially self-supporting in that it will provide sufficient thermal energy to maintain reactor temperature once combustion is started therein. In addition, any excess heat produced in the combustion process can be utilized for other purposes in the practice of the invention, such particularly as sterilization of the liquid removed in dewatering or the heating of the mixed slurry and sludge prior to dewatering.

Primary objects of the invention include the provision of a process and apparatus for the disposal of both waste sludge and municipal refuse which will enable both materials to be handled and disposed of more readily, by less expensive equipment, and at lower maintenance and operating costs, than can be done by any other method or apparatus presently available. Additional objects and advantages will be apparent from the foregoing general description and the subsequent detailed description of a preferred embodiment of the invention, taken in conjunction with the accompanying drawing and the appended claims.

BRIEF DESCRIPTION OF THE DRAWING

The FIG. is a diagrammatic plan view illustrating a complete system in accordance with and for carrying out the method of the invention.

DESCRIPTION OF PREFERRED EMBODIMENTS

In the FIG., the apparatus for pulping, compacting and separating the constituents of municipal wastes are shown as comprising a pulper 10 generally of the construction disclosed in the above Baxter application and in Felton and Vokes U.S. Pat. No. 3,339,851, issued Sept. 5, 1967 to the assignee of this application. This pulper includes a tub 11 equipped with a rotor 13 mounted for rotation centrally of the bottom portion of the tub in cooperation with a perforate screen plate 15, and there is a compartment below the bottom of the tub into which the perforate screen plate 15 transmits particles which have been sufficiently reduced in size to pass through its perforations. For preferred practice of the invention, these perforations are of relatively small size, preferably of the range of ½inch to one inch diameter, and the slurry passing therethrough is withdrawn from the pulper by the conduit 16.

As described in the Baxter application, municipal wastes and water are delivered continuously or intermittently to the pulper tub 11, and the construction and operation of the pulper produce maximum forces of hydraulic shear in its contents, causing defibering of the paper waste material and disintegration of other wastes, both organic and inorganic. The rotor also has a mechanical action which combines with the hydraulic action to reduce the size of nondegradable waste, such as metal cans, by striking them with such force as to have the effect of rolling them into balls, and the same action causes glass bottles and other frangible materials to be quickly broken into multiple small fragments. Other metal wastes of larger sizes are also rapidly compacted, while the vertical action in the tub causes wires and other stringy or nonfibrous sheet materials to be wound into a ropelike form for ready removal from above.

Provision is made for removing each of these two classes of solid waste from the tub 11 separately from each other and from the pulpable slurry which passes through the screen 15 into the conduit 16. The stringy materials are removed by a ragger 20 as disclosed in the Baxter application and in Cowles U.S. Pat. No. 2,340,511 issued Feb. 1, 1955. The compacted metal and other hard material of too large particle size to pass through the screen plate 15 are separated from the slurry in the tub by gravity with the aid of a continuous junk remover 22, also as described in the Baxter application.

The FIG. illustrates the application of the invention to a complete system for continuous processing of municipal sewage sludges and solid wastes, in which the pulper 10 of the characteristics already described is the primary apparatus. It receives the solid waste continuously or intermittently from a conveyor 25, and it is also provided with a continuously available supply line 26 of fresh water for wash-up purposes, and also for initial charging of the pulper if desired.

The pulper 10 progressively reduces as much as possible of the solid wastes to a slurry form, and since the paper content of average municipal wastes now approaches 50 percent, approximately 50 percent of the particles in the slurry will be fibers. The balance will be of varied nature, ranging from organic materials derived from garbage and human waste to hard particles which can generally be grouped under the heading "grit." All of this material will be delivered to the conduit 16 as soon as it is of sufficiently small particle size to pass through the perforations of screen 15.

The FIG. also shows schematically a standard sewage treatment plant for effecting sedimentation of sewage sludge and clarification of effluent, comprising a primary sedimentation tank 30, an aeration tank 31, and a final sedimentation tank 32, all in series. Sanitary sewage from main sewage line 33 passes through primary sedimentation tank 30 where its flow rate and detention time determine the percentage removal of solids from the influent. These solids settle to the bottom of tank 30 in the form of sewage sludge, and the effluent is delivered through line 35 to aeration tank 31.

A line 36 supplies compressed air to the liquid in aeration tank 31 in order to suppress anaerobic decomposition and to remove dissolved or suspended solids therefrom. The liquid is delivered through line 37 to the final sedimentation tank 32 where a flocculent precipitate, called activated sludge, settles out to leave a clear, odorless effluent. For proper results, some of this precipitate is recycled to tank 31 through line 41 for seeding purposes. Excess activated sludge is recycled to primary tank 30 through line 42. The clarified effluent from tank 32 may be chlorinated or otherwise chemically treated.

In present practice, the waste sludge from primary sedimentation tank 30 is transferred to an enclosed insulated tank where anaerobic digestion takes place free from contact with atmospheric oxygen. However, the process of anerobic decomposition requires ten to fifteen days, its initial equipment cost is high, and it requires special maintenance and supervision. In accordance with the present invention, the digestion apparatus and operation are eliminated, the sludge is mixed directly with the slurry of other wastes, and the resulting mixture of sludge and slurry is then processed for ultimate disposal.

In the preferred practice of the invention, the sludge is mixed with the slurry which has been extracted from the pulper 10, and this is represented in the FIG. by a mixing tank 45 to which the slurry and sludge are delivered by the conduit 16 and a line 46 from the pulper 10 and sedimentation tank 30 respectively. Alternatively, the sludge can be delivered directly to the pulper, as indicated by the line 48, for pulping with the other wastes, or added to the refuse prior to delivery of both constituents by conveyor 25 to the pulper. However, these methods of mixing will result in contamination of the insoluble hard materials which are removed by the junk remover 22, and may therefore require a more thorough washing than that provided in junk remover 22 before they are further handled. In either event, the system as shown will ultimately provide in the mixing tank 45 a suspension comprising the extracted waste slurry produced in the pulper 10 and the sludge from the sedimentation tank 30.

In the average municipality the sludge produced by the sanitary sewage system amounts to a relatively small proportion of the total solid waste requiring disposal, for example of the order of 5 percent. Therefore, even if all of the sludge produced during a given period is mixed with the slurry produced by treatment in the pulper 10 of the solid wastes collected for the same time period, the amount of sludge will still be minor in comparison with the amount of fibrous material, particularly the cellulose fibers produced by pulping of the large amount of paper products found in municipal trash and garbage. The invention takes major advantage of this mixture of materials in its further treatment thereof, and in particular it takes advantage of the fact that with the relatively gelatinous sludge mixed with the much larger quantity of fibrous constituents of the slurry, the resulting conglomorate is easily concentrated to comparatively solid consistency by conventional filtering or other dewatering apparatus.

Thus in the FIG., the mixture of extracted slurry and sludge is shown as pumped from the mixing tank 45 by a pump 50 to suitable grit removers, shown as a plurality of liquid cyclones 55 connected in parallel for the removal of high specific gravity gritty material. This step is not necessarily essential to the success of the invention, but it is highly desirable, particularly if the dewatering is to be carried out by a vacuum filter, since otherwise the filter would be subject to unnecessary damage if the gritty materials are allowed to remain in the slurry. The accepted material from the cyclones 55 is accordingly shown as being delivered to any appropriate means 60 for dewatering, and as one example, the invention may be readily practiced by means of a vacuum filter 60 of conventional construction, which is capable of increasing the solids content of the slurry from less than 1 to 30 or more. Other dewatering means such as a screw press or centrifuge may be used, particularly when a higher degree of concentration is desired, and it is also possible to combine the step of mixing the sludge and slurry with the dewatering step, for example by adding sludge to the slurry as a vacuum filter.

The products of the dewatering operation, namely filter cake and removed liquid, may be handled in various ways. One aspect of the invention takes particular advantage of the fact that the dewatering can readily be carried to a point at which the resulting filter cake is capable of sustaining its own combustion, due to the large proportion of fibrous constituents, and this result can be achieved with a solids content of the order of 25 percent or more. This is illustrated in the FIG. by the provision of a conveyor 65, such as a screw feeder, connected between the dewatering apparatus 60 and a suitable incinerator 66. Alternatively, the filter cake may be used for other purposes, such as composting or the like, but because it comprises relatively combustible wastes of low value, it is most conveniently disposed of by incineration. The removed liquid, which will still contain suspended and dissolved solids may be recycled through a return line 68 to the junk remover 22 for use as makeup liquid in the pulper 10, or it may be bled back into the aeration tank 31 by line 67 for treatment with activated sludge.

While practice of the invention does not require the use of a specific type of incinerator, highly satisfactory results are obtained if the incineration is carried out in a fluidized bed reactor, particularly because of the completeness of disposal and simplicity of operation of this type of incinerator as compared, for example, with multiple hearth and flash-type incinerators. The incinerator 66 in the FIG. is accordingly shown as a fluidized bed reactor, body 70 of cylindrical configuration which includes a tapered lower portion in which an orifice plate or grate 71 supports the bed 72 of particles of sand, stone or the like.

In operation, the particles which comprise the bed 72 are preheated by suitable heating means (not shown) to a relatively high temperature, e.g. 1500°F., and air is blown upward through the orifice plate 71 to fluidize the bed 72, as indicated by the blower 75. The filter cake from the filter 60 is delivered by the conveyor 65 to the top of the body 70 for downward delivery thereto, and it is desirable to break up the filter cake as it is delivered by means such as a jet of air introduced as indicated by the nozzle 77. The filter cake is initially incinerated by contact with the heated particles of the fluidized bed, and the high proportion of fibers and other readily flammable materials in the filter cake thereafter continue to support the combustion and to maintain the heat of the fluidized bed particles sufficiently so that use of the external heat source may be discontinued.

The relatively small residue of ash produced in the fluidized bed reactor may be disposed of by conventional means which in no way involve the invention. It is desirable in the practice of the invention, however, to utilize the heat produced by the combustion by means of a heat exchanger 80 in association with the flue 81 or other mechanism for disposing of the products of combustion within the reactor. For example, the heat exchanger 80 may be connected with a line 82 receiving the liquid removed by the dewatering means 60 so that this liquid will be heated before it is recycled to the pulper. The invention contemplates that with this arrangement, the removed liquid may be heated to the point of sterilization before it is reused for pulping purposes, thereby contributing both to sanitation and to the ease of pulping and the subsequent dewatering of the extracted slurry from the pulper.

An alternative way of utilizing the heat generated by the incinerator 66 is for preheating the extracted slurry from the pulper 10 before it is dewatered. Heat left over from heat exchanger 80 may be directed for this purpose through lines 84 and 86 to heat exchanger 88, or, alternatively, the heat from incinerator 66 may be directly administered to the mixed slurry from flue 81 through line 86. Such preheating will provide one or both of two significant advantages, namely increased ease of dewatering, especially by a vacuum filter, and also sanitation if the heating is carried to the point of sterilization. It is of course apparent that any of these heating steps can be carried out by heat obtained from another source, and also that sterilization can be effected by the addition of a suitable sterilizing agent, e.g. a chlorine, but the economics of the system and process are enhanced when disposition of the wastes is by incineration, and the heat produced by such incineration is reused in the system.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

We claim:
1. A method of treating waste material comprising:
  a. depositing in a waste treatment tub an aqueous medium and refuse including;
    i. a relatively high proportion of fibrous and other organic materials with the percentage of said refuse constituted by said fibrous material being greater than the percentage of said refuse constituted by any other component thereof, and
    ii. glass, metal and other inorganic materials,
  b. subjecting said refuse to comminution to reduce at least said fibrous material to at least a predetermined particulate size:
  c. extracting from said tub in slurry form refuse below said predetermined particulate size and some of said aqueous medium:
  d. mixing sludge with said refuse; and
  e. subsequent to said extraction, removing a substantial portion of said aqueous medium from said mixed sludge and refuse.

2. The method of claim 1 wherein; said sludge is mixed with said refuse prior to deposition thereof in said waste treatment tub.

3. The method of claim 1 wherein; said sludge is mixed with said refuse in said waste treatment tub.

4. The method of claim 1 wherein; said sludge is mixed with said refuse subsequent to said extraction of said refuse in said slurry form from said tub.

5. The method of claim 1 wherein; said sludge is mixed with said refuse concurrently with dewatering of said refuse in said slurry form.

6. The method of claim 1 wherein; said fibrous material comprises approximately 50 percent of said refuse.

7. The method of claim 1 wherein; said fibrous material comprises in excess of 50 percent of said refuse.

8. The method of claim 1 wherein; said sludge comprises approximately 5 percent of the total of said refuse and said sludge.

9. The method of claim 1 wherein; said step of removing said aqueous medium from said mixed sludge and refuse comprises removing said aqueous medium from said mixed sludge and refuse until the resulting mass is capable of supporting combustion.

10. The method of claim 9 wherein; said step of removing said aqueous medium from said mixed sludge and refuse is continued until the solids content of the resultant mass is in excess of 25 percent.

11. The method of claim 1 further comprising; separating gritty materials from said slurry prior to said removal of said substantial portion of said aqueous medium therefrom.

12. The method of claim 1 further comprising; removing at least a portion of said inorganic materials from said waste treatment tub separately from said refuse in slurry form.

13. The method of claim 12 wherein said refuse deposited in said tub includes stringy material and said method further comprises; removing said stringy material from said waste treatment tub separately from said portion of said inorganic material and said refuse in slurry form.

14. The method of claim 1 further comprising; returning said aqueous medium removed from said mixed sludge and refuse to said waste treatment tub.

15. The method of claim 14 further comprising; subjecting said aqueous medium removed from said mixed sludge and refuse to sterilization prior to its return to said waste treatment tub.